United States Patent [19]

Sanzenbacher

[11] Patent Number: 4,536,213
[45] Date of Patent: Aug. 20, 1985

[54] REFORMING OF HIGHER HYDROCARBONS FOR METAL OXIDE REDUCTION

[75] Inventor: Charles W. Sanzenbacher, Charlotte, N.C.

[73] Assignee: Mildrex International, B.V., Zurich, Switzerland

[21] Appl. No.: 648,564

[22] Filed: Sep. 10, 1984

[51] Int. Cl.³ .............................................. C21B 13/02
[52] U.S. Cl. .............................................. 75/91; 75/35
[58] Field of Search .......................... 75/34, 35, 91, 26

[56] References Cited

U.S. PATENT DOCUMENTS

| 3,392,008 | 7/1968 | Wald | 75/26 |
| 4,032,120 | 6/1977 | Beggs | 75/35 |
| 4,054,444 | 10/1977 | Clark et al. | 75/34 |

Primary Examiner—Melvyn J. Andrews
Attorney, Agent, or Firm—Ralph H. Dougherty

[57] ABSTRACT

A method for utilizing pentane and higher hydrocarbons in a shaft furnace direct reduction process without any special treatment and without any special reforming catalyst, and in particular a method for the reforming of such higher hydrocarbons in conjunction with the direct reduction of metallic oxides by cracking and partial reformation of such gases within the shaft furnace prior to stoichiometric reformation of the gases.

6 Claims, 2 Drawing Figures

REFORMING OF HIGHER HYDROCARBONS FOR METAL OXIDE REDUCTION

BACKGROUND OF THE INVENTION

This application relates to the reforming of the hydrocarbons pentane and higher into the reductants carbon monoxide and hydrogen for use as reducing gas. Such gases are commonly utilized for the direct reduction of metal oxides to the metallized form by the use of reducing gases. The present invention is particularly well suited to the direct reduction of iron from particulate iron or oxides. At present, processes such as the direct reduction of iron, utilize gases, such as natural gas, which consists principally of methane ($CH_4$), with some ethane ($C_2H_6$), propane ($C_3H_8$), and butane ($C_4H_{10}$). Natural gas also contains some higher hydrocarbons, pentane ($C_5H_{12}$), hexane ($C_7H_{16}$), heptane ($C_6H_{18}$), etc.

Currently available natural gases in many areas of the world are displaying increasing concentrations of these higher hydrocarbons (as used herein meaning $C_5$ and above). Such higher hydrocarbons tend to be difficult to reform stoichiometrically. Even low concentrations of such higher hydrocarbons are difficult to reform stoichiometrically without depositing carbon on the reforming catalyst.

Research is continuing to develop suitable catalysts and commercial equipment is available to extract higher hydrocarbons from gaseous fuels. However, it is desirable to be able to utilize natural gases containing higher hydrocarbons without the necessity of special treatment or use of special catalysts for such treatment.

The present invention is a method for the direct reduction of metal oxides in a shaft furnace direct reduction process utilizing gases containing higher hydrocarbons.

OBJECTS OF THE INVENTION

It is the primary object of this invention to provide a method for utilizing pentane and higher hydrocarbons in a direct reduction process without any special treatment and without any special reforming catalyst.

SUMMARY OF THE INVENTION

In this invention, natural gas containing higher hydrocarbons is passed through a portion of the hot burden in a direct reduction shaft furnace, after which the gas is removed and reformed. The higher hydrocarbons are cracked and partially reformed within the furnace because of the large surface area of the burden which acts as a catalyst. The cracking of the higher hydrocarbons causes their partial reformation to carbon monoxide and hydrogen along with deposition of carbon on the material in the burden. This is advantageous because additional carbon is frequently desired in the end product. However, the main advantage is to cause any carbon deposition to occur within the reduction furnace and not in the reformer.

BRIEF DESCRIPTION OF THE DRAWINGS

This invention is better understood by refering to the following detailed description and the appended drawings in which.

DETAILED DESCRIPTION

Figure 1:
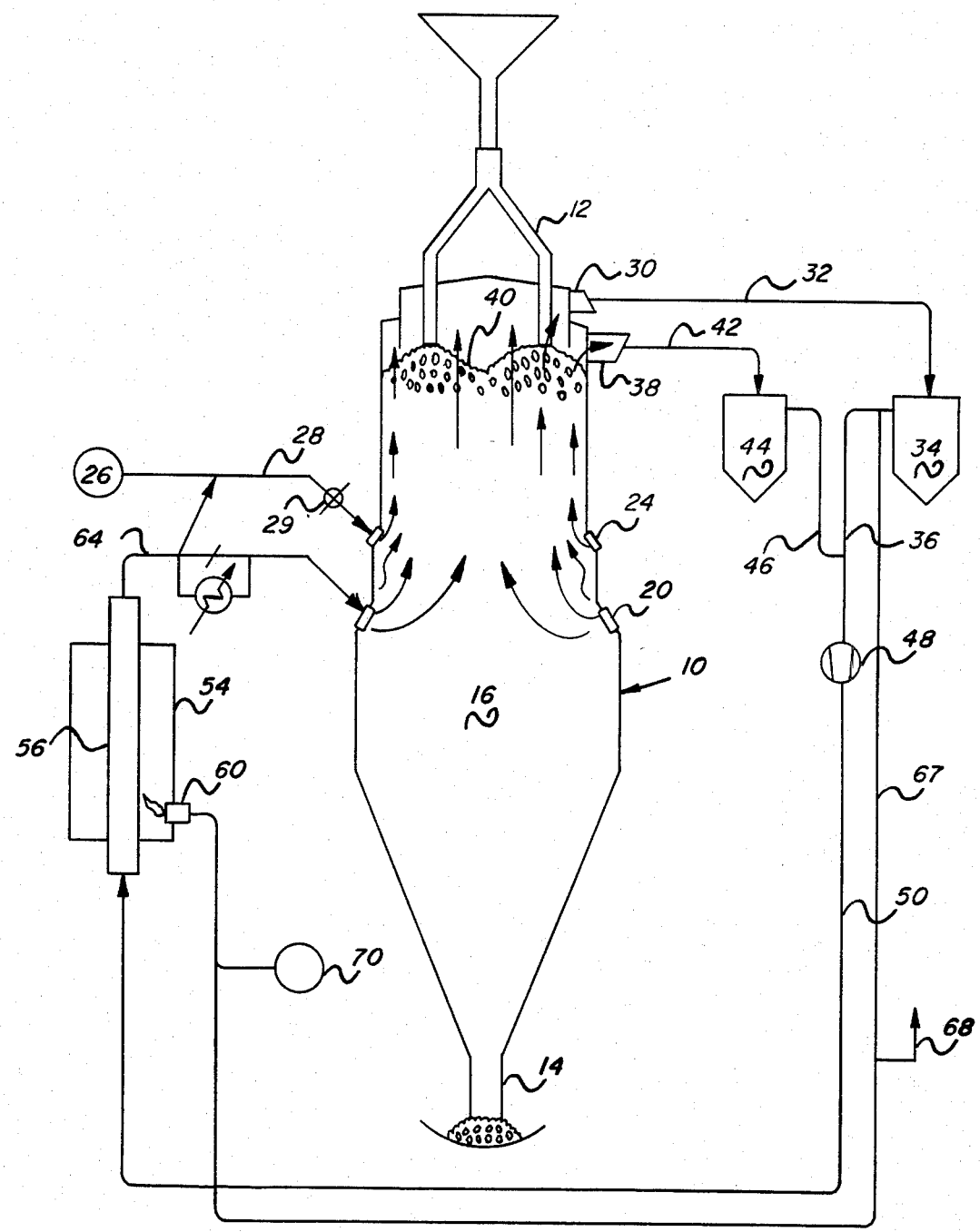
FIG. 1 is a schematic drawing of a shaft furnace direct reduction process flow sheet utilizing the invented process, and which results in a hot product discharge.

Refering now to FIG. 1, shaft furnace 10 is provided with feed means, shown as feed pipes 12, at the top thereof, and a product withdrawal or discharge pipe 14 at the bottom thereof. Particulate oxides, such as iron oxide in the form of lumps or pellets, are fed through pipes 12 to form a packed bed burden 16 within the shaft furnace. The speed of descent of the burden is controlled by the removal of treated burden material from the bottom of the furnace.

Intermediate the ends of the furnace is located a hot bustle gas inlet 20 which introduces hot reducing gas to the furnace through a plurality of gas inlet ports arranged in the furnace wall. Located above the hot reducing gas inlet 20 is a second gas inlet 24, which communicates with a source 26 of process gas and/or natural gas containing higher hydrocarbons via pipe 28 having a control valve 29 therein. Preferably four such pipes 28 are utilized, one feeding each quadrant of the bustle. Gas inlet ports 24 are arranged completely around the perimeter of the furnace wall in a manner such that each pipe 28 is connected to a 90° sector of gas inlet ports 24. Valves 29 are operated to introduce gas to one or more of the 90° sectors of gas inlet ports 24 in a sequential manner. A hot gas off-take 30 is located at the top of the shaft furnace. A gas pipe 32 communicates between off-take 30 and cooler-scrubber 34, which is provided with a gas withdrawal pipe 36. A second, lower, gas off-take 38 between the top of the burden stockline 40 and the elevation of upper off-take 30 is connected to pipe 42 which communicates with scrubber 44. Gas from scrubber 44 passes through pipe 46, compressor 48 and pipe 50, then is introduced to reformer 54 containing a plurality of heat resistant alloy reformer tubes 56, only one of which is shown. Each tube 56 is filled with ceramic reforming catalyst such as alumina, at least a portion of which is generally nickel impregnated. The tubes are enclosed within refractory lined reformer furnace 54 having heating burners 60, only one of which is shown, which heat the tubes and the reforming catalyst therein.

A reformed gas pipe 64 connects the reformed gas outlet of reformer 54 to bustle gas inlet 20 to complete the gas circuit. Top gas fuel can be withdrawn from the system through line 67. This is preferably utilized as the primary fuel to heat the reformer.

Since the shaft furnace 10 includes no means for cooling the burden prior to discharge, the embodiment of FIG. 1 results in hot discharge of particulate metallized particles through discharge pipe 14.

In operation, process gas and/or natural gas containing higher hydrocarbons from source 26 are fed through line 28 to bustle gas inlet 24. The gas mixture containing higher hydrocarbons tends to flow along the wall of the furnace, as the reformed gases introduced through lower inlets 20 move more through the center of the burden as they pass upwardly in counter-flow relation to the downwardly descending burden. Valves 29 are operated sequentially. When a valve 29 is closed, the upper portion of the burden is preheated by the rising hot reducing gas in that 90° sector of the furnace. When that valve 29 is re-opened, the gas mixture containing the higher hydrocarbons passes through the previously preheated burden and the higher hydrocarbons crack, commencing to reform thermally into hydrogen and carbon monoxide, forming some $H_2O$, carbon dioxide and free carbon, the latter being deposited on the particles in the burden. The partially reformed gases are withdrawn through lower top-gas off-take 38 and pipe 42, then cooled and scrubbed in scrubber 44 and delivered to reformer 54 through pipe 50. The hot spent higher hydrocarbon lean top-gas is removed through off-take 30 and passed through pipe 32 into cooler-scrubber 34, after which it is removed by line 36 and mixed with the cooled, scrubbed, partially reformed process gas from line 46. Due to expansion in the system, a certain amount of top gas fuel will be formed, which is removed through line 67 and delivered to the reformer burners 60. Additional natural gas fuel can be introduced to line 67 from natural gas source 70, as required.

Figure 2:
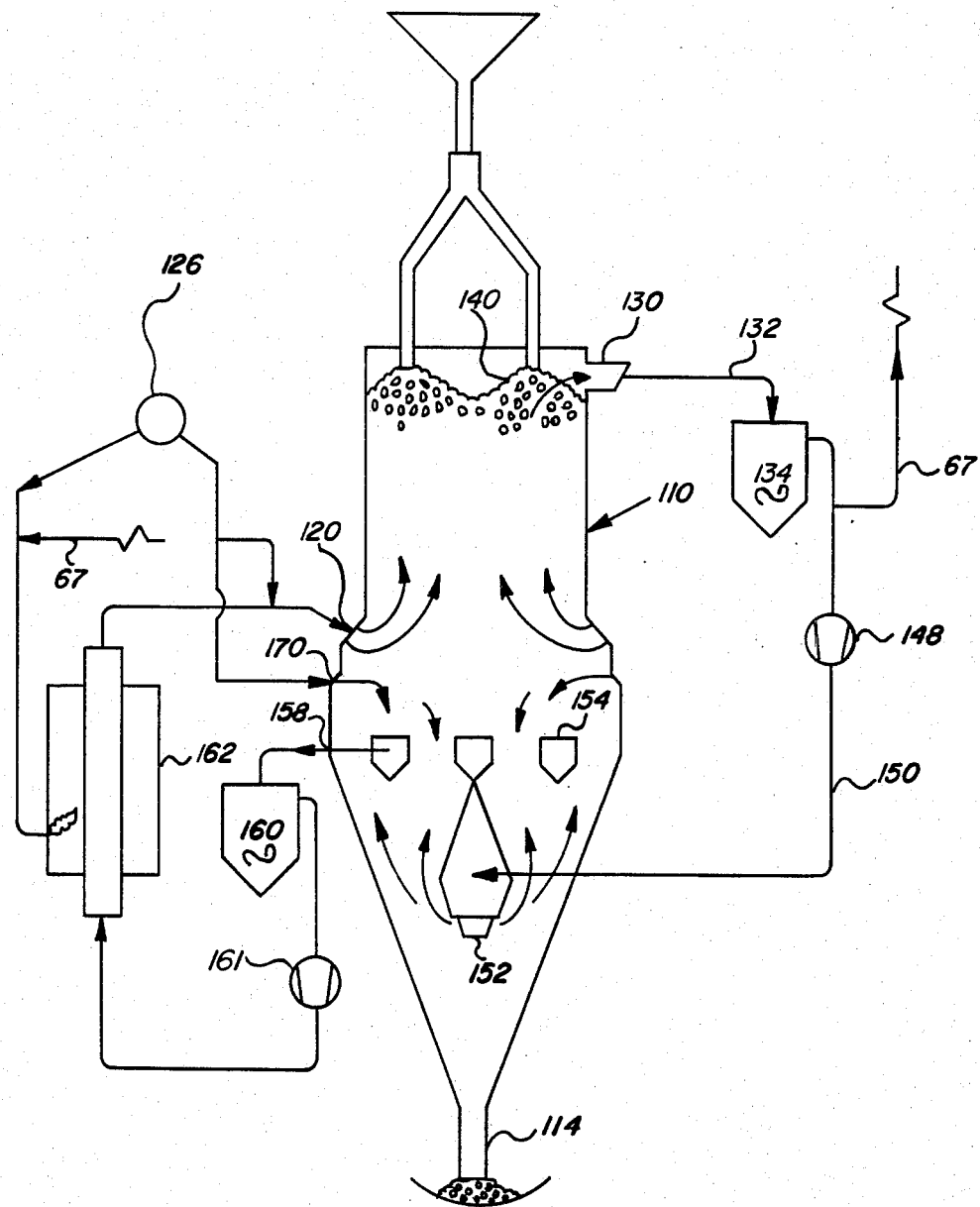
FIG. 2 is a flow sheet similar to FIG. 1 showing an alternative embodiment utilizing the invented process, and which results in cold product discharge.

The alternative embodiment shown in FIG. 2 utilizes a cooling gas system to cool the metallized product within the shaft furnace 110 prior to discharge through pipe 114. In this case, the process gas and/or natural gas from source 126 is introduced to the shaft furnace to a point beneath the bustle gas inlet 120. The hot burden partially reforms and cracks the higher hydrocarbons, after which these gases are removed from the furnace along with the spent cooling gas.

Referring now to FIG. 2, shaft furnace 110 has a bustle gas inlet 120 for introduction of hot reducing gas. Hot spent top gas is removed from the top of the furnace through spent off take 130 located between the burden stock line 140 and the top of the furnace. A pipe 132 communicates with a cooler-scrubber 134. Cleaned cooled gas from the scrubber passes through compressor 148 and pipe 150, then is introduced to the cooling zone of the shaft furnace via a cooling gas distributor 152. Gas collectors 154 above the cooling gas distributor remove the partially reformed gases and the spent cooling gases from the furnace. This gas mixture is passed through cooling gas off-take 158, cooler 160, compressor 161 and then is passed into stoichiometric reformer 162.

Process gas of natural gas is introduced to the furnace 110 through bustle gas inlets 170.

In operation, process gas is heated by the hot descending burden and is drawn downwardly by the cooling gas collectors 154, where it mixes with the hot cooling gas, then the mixture is removed from the system through off-take 158, is cleaned, and cooled in scrubber-cooler 160, and delivered to the reformer 162.

Thus it is seen that in the embodiment of FIG. 2 the process gas containing higher hydrocarbons is reformed along with spent cooling gas. In both embodiments of the invention, the process gas is partially reformed and cracked by the hot burden material within the shaft furnace prior to introducing the process gas containing higher hydrocarbons to the stoichiometric reformer.

SUMMARY OF ACHIEVEMENT OF THE OBJECTS OF THE INVENTION

From the foregoing it is readily apparent that I have provided a method for utilizing pentane and higher hydrocarbons in a direct reduction process without any special treatment and without any special reforming catalyst.

It is also apparent from the foregoing that other alternative embodiments of the invention are possible. Thus, while in accordance with the patent statutes, both prefered and alternative embodiments of the invention have been illustrated and described in detail, it is to be particularly understood that the invention is not limited thereto or thereby, but only by the scope of the following claims.

What is claimed is:

1. A process for reducing metallic oxide to metallized material utilizing process fuel gas containing higher hydrocarbons of pentane or higher, comprising:
   a. establishing a gravitational flow of particulate metallic oxide material through a generally vertical shaft furnace by charging such materials to the upper portion of said shaft furnace to establish a particulate burden therein having an upper stock line, and removing metallized product from the bottom of said furnace;
   b. introducing a reducing gas mixture to said gravitational flow of material in said shaft furnace intermediate the ends of said furnace;
   c. causing said reducing gas mixture to flow countercurrently through said gravitational flow of material, reducing the oxide material to metallized product and forming a reacted top gas;
   d. removing said reacted top gas from the top of said furnace;
   e. introducing process fuel gas containing higher hydrocarbons of pentane or higher to said furnace at an elevation above that of the reducing gas introduction;
   f. causing said process fuel gas containing said higher hydrocarbons to flow upwardly through said burden;
   g. removing a substantial portion of said process gas with said higher hydrocarbons at an elevation above the stock line but lower than the elevation at which reacted top gas is removed;
   h. cleaning and scrubbing said top gas and said process gas; i. combining said cleaned and scrubbed top gas and process gas and passing the mixture through a stoichiometric reformer to form a reformed gas; and
   j. introducing said reformed gas to said shaft furnace through the bustle gas inlet.

2. A process according to claim 1 wherein a portion of said cleaned, cooled higher hydrocarbon-lean spent top gas is utilized as fuel to heat said stoichiometric reformer.

3. A process according to claim 1 wherein said process fuel gas containing higher hydrocarbons is introduced sequentially about the periphery of the furnace.

4. A process for reducing metallic oxide to cooled metallized material utilizing process fuel gas containing higher hydrocarbons of pentane or higher, comprising:
   a. establishing a gravitational flow of particulate metallic oxide material through a generally vertical shaft furnace by charging such materials to the upper portion of said shaft furnace and removing metallized product from the bottom of said furnace;
   b. introducing a hot reducing gas to said gravitational flow of material in said shaft furnace intermediate the ends of said furnace;
   c. causing said reducing gas mixture to flow countercurrently through said gravitational flow of materials, reducing the oxide material to metallized product and forming a top gas;
   d. cleaning and cooling said removed top gas:

e. introducing said cleaned and cooled top gas to said furnace at an elevation beneath that of reducing gas introduction as cooling gas, and passing said cooling gas through a portion of said furnace designated as the cooling zone;

f. introducing natural gas containing higher hydrocarbons of pentane or higher at an elevation beneath that of the reducing gas introduction, but above that of the cooling zone;

g. causing said natural gas containing said higher hydrocarbons to flow downwardly through said burden, become heated and partially reformed and cracked thereby, and removing said process gas with said higher hydrocarbons along with said cooling gas, and forming a gas mixture;

h. passing said mixture through a stoichiometric reformer to form a hot reducing gas mixture; and i. introducing said hot reformed reducing gas mixture to said shaft furnace through the bustle gas inlet.

5. A process according to claim 4 wherein a portion of said cleaned, cooled spent top gas is utilized as fuel to heat said stoichiometric reformer.

6. A process according to claim 4 wherein said process fuel gas containing higher hydrocarbons is introduced sequentially about the periphery of the furnace.

* * * * *